(12) United States Patent
Rechter

(10) Patent No.: US 6,698,014 B1
(45) Date of Patent: Feb. 24, 2004

(54) SYSTEM FOR AUTOMATICALLY CONVERTING SOURCE CODE FROM ONE PROGRAMMING LANGUAGE TO ANOTHER

(75) Inventor: David Rechter, Herzlia (IL)

(73) Assignee: Convert Systems Inc., Wilmington, DE (US)

(*) Notice: Subject to any disclaimer, the term of this patent is extended or adjusted under 35 U.S.C. 154(b) by 482 days.

(21) Appl. No.: 09/659,699

(22) Filed: Sep. 11, 2000

Related U.S. Application Data

(60) Provisional application No. 60/159,429, filed on Oct. 14, 1999.

(51) Int. Cl.[7] ................................................ G06F 9/45
(52) U.S. Cl. ....................................................... 717/137
(58) Field of Search .............................. 717/136–137, 717/141, 143, 146–147

(56) References Cited

U.S. PATENT DOCUMENTS

| | | | |
|---|---|---|---|
| 6,389,385 B1 | * 5/2002 | King ........................... 703/27 |
| 6,453,464 B1 | * 9/2002 | Sullivan ...................... 717/137 |
| 6,467,079 B1 | * 10/2002 | Ettritch et al. .............. 717/108 |
| 6,516,461 B1 | * 2/2003 | Ichisugi ....................... 717/144 |
| 6,523,171 B1 | * 2/2003 | Dupuy et al. ................ 717/136 |

OTHER PUBLICATIONS

Meadows et al. Migrating CM Fortran Applications to HPF. IEEE. 1995. pp. 37–40.*

Banning. The XDOS Binary Code Conversion System. IEEE. 1989. pp. 282–287.*

* cited by examiner

*Primary Examiner*—Wei Zhen
(74) *Attorney, Agent, or Firm*—Eitan, Pearl, Latzer & Cohen Zedek, LLP

(57) ABSTRACT

A method and system for automatically converting source code from a first software language and platform to a second software language and platform. The method includes the steps of separating the source code of the first software language and platform into at least one element in at least one table, optimizing the element producing at least one optimized element, and rewriting the source code in the second software language and platform from the optimized element.

32 Claims, 5 Drawing Sheets

SYSTEM FOR AUTOMATICALLY CONVERTING SOURCE CODE FROM ONE PROGRAMMING LANGUAGE TO ANOTHER

CROSS REFERENCE TO RELATED APPLICATIONS

This application is related to U.S. Provisional Patent Application No. 60/159,429, filed Oct. 14, 1999 and entitled "System For Automatically Converting Source Code From One Programming Language To Another", which application is incorporated in its entirety herein by reference.

FIELD OF THE INVENTION

The present invention relates to a system and method for automatically converting source code between different environments and, more particularly, to a conversion engine that automatically converts source code between, for example, different operating systems and development tools, and from one software language to another.

BACKGROUND OF THE INVENTION

Recent years have seen major changes in the information systems of many corporations and business organizations. Advances in both computer hardware and software systems have created a growing problem of information system obsolesce.

The technological development of hardware has led to the development of new processors with more powerful performance levels, while prices have fallen. The technology of miniaturization of electronic components has led to developments in peripheral computer equipment. Finally, mainframe and mini computers are being replaced by personal computers. Changes in hardware have been accompanied by parallel changes in software. Programs have been developed making use of the new capabilities of the hardware, in order to meet the demands of users for more efficient and powerful computer performance.

These developments have furthered the changing role of the computer, A computer is now a popular consumer product that is used for many different applications containing various new types of data.

Microsoft Corporation of Redmond Wash., USA, whose products have captured a large majority of the market share in personal computer products worldwide, has played a major role in Influencing the direction of development of new computer products, Microsoft Corporation has been able to influence general trends in software development and even to invent new standards that have been recognized by most software developers.

Microsoft Corporation has developed a middleware-based solution known as Universal Data Access. The goal of Universal Data Access is to ensure open, integrated, standards-based access to all types of data across a wide variety of applications. Types of data include not only relational database data but also, for example, unstructured data including non-traditional data such as html tables. Types of applications include client/server and Web-based, among others.

A high-level interface to this Microsoft Corporation architecture is ActiveX Data Object (ADO); lower-level interfaces are ODBC and OLE DB (all from Microsoft Corporation). Commercial products exist which supply the service and data providers necessary to use this technology. This architecture provides the ability to transfer data between applications by providing standardized interfaces for all types of data. This maximizes interoperability and reusability, while leaving the data in its source application.

One result of the computer environment changes has been the need for companies to upgrade their hardware and software to make use of the latest technologies. In light of this changing environment, many business organizations have found that their existing information technologies are not compatible with each other due to a lack of standard tools and to software written using various development tools. This increases the maintenance costs of those systems and makes setting standards in the organization difficult.

Furthermore, upgrading and converting the systems into new working platforms often requires redevelopment of the organization's computer systems to make them compatible with the new working environment. The process of re-writing the programs takes a lot of time and can delay the natural growth of the organization. It can also mean special deployment in the organization and added expense.

Therefore, a fully automatic system and method for converting source code is needed to assist these organizations in converting their software between different software languages and development platforms. Until now, there has been no successful solution to this problem.

SUMMARY OF THE INVENTION

There is provided in accordance with a preferred embodiment of the present invention, a method for automatically converting source code from a first software language and platform to a second software language and platform. The method includes the steps of separating the source code of the first software language and platform into at least one element in at least one table, optimizing the element producing at least one optimized element, and rewriting the source code in the second software language and platform from the optimized element.

Moreover, in accordance with a preferred embodiment of the present invention, the method further includes the step of automatically creating environment files from information about the platform.

Further, in accordance with a preferred embodiment of the present invention, the step of separating includes the steps of recognizing a line keyword for each of the code lines of the source code, finding keywords in each of the respective code lines relating to the line keywords, determining the properties of the keywords, and creating the element from the properties of the keywords.

Additionally, in accordance with a preferred embodiment of the present invention, the step of optimizing includes the step of analyzing and converting the data encapsulated in the element to produce generic data.

Still further, in accordance with a preferred embodiment of the present invention, the step of analyzing and converting includes the step of defining different module types.

Moreover, in accordance with a preferred embodiment of the present invention, the step of analyzing and converting further includes the step of updating the element.

Additionally, in accordance with a preferred embodiment of the present invention, the step of analyzing and converting further includes the step of separating database code from other application code.

Furthermore, in accordance with a preferred embodiment of the present invention, the step of analyzing and converting further includes the step of defining the data flow within the source code.

Still further, in accordance with a preferred embodiment of the present invention, the step of analyzing and converting further includes the step of defining events.

Moreover, in accordance with a preferred embodiment of the present invention, the step of analyzing and converting further includes the step of recommending the creation of stored procedures from a specified section of the second software language.

Additionally, in accordance with a preferred embodiment of the present invention, the step of analyzing and converting further includes the step of converting the graphical user interface (GUI) to a recognized standard GUI.

Furthermore, in accordance with a preferred embodiment of the present invention, the step of analyzing and converting further includes the step of defining internal connections.

Still further, in accordance with a preferred embodiment of the present invention, the step of analyzing and converting further includes the step of defining the inheritance of properties.

Moreover, in accordance with a preferred embodiment of the present invention, the method further includes the step of externally driven optimization. The externally driven optimization step includes the steps of performing global changes of names and performing changes to a graphical user interface.

There is further provided in accordance with a preferred embodiment of the present invention, a method for the automatic generation of a generic database. The method includes the steps of separating the source code of a first software language and platform into at least one element in at least one table and optimizing the element, producing at least one optimized element.

There is still further provided in accordance with a preferred embodiment of the present invention, a system for automatically converting source code from a first software language and platform to a second software language and platform. The system includes a source-code analyzer and deconstructor for separating the source code of the first software language and platform into at least one element in at least one table, an optimizer for optimizing the element producing at least one optimized element, and a code generator for rewriting the source code in the second software language and platform from the optimized element.

Additionally, in accordance with a preferred embodiment of the present invention, the system further includes a unit for automatically creating environment files from information about the platform.

Furthermore, in accordance with a preferred embodiment of the present invention, the system further includes an external optimizer including a graphics conversion unit for converting the GUI to a recognized standard GUI.

Moreover, in accordance with a preferred embodiment of the present invention, the graphics conversion unit includes a unit for performing global changes of names and a unit for performing changes to a GUI.

There is still further provided in accordance with a preferred embodiment of the present invention, a system for the automatic generation of a generic database. The system includes a source-code analyzer and deconstructor for separating the source code of a first software language and platform into at least one element in at least one table, and an optimizer for optimizing the element producing at least one optimized element.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

The code conversion system automatically converts source code running on a given operating system and environment to source code written in a possibly different programming language or version and environment. The present invention includes a generic database consisting of a multiplicity of tables, describing substantially all aspects of the run-time system. For example, different possible language, database, and user interface components are described along with the information regarding connections between records in different tables. Applicant has realized that use of a middle step in the conversion process, converting to the generic database, will allow for a conversion process independent of the operating system and environment.

Figure 1:
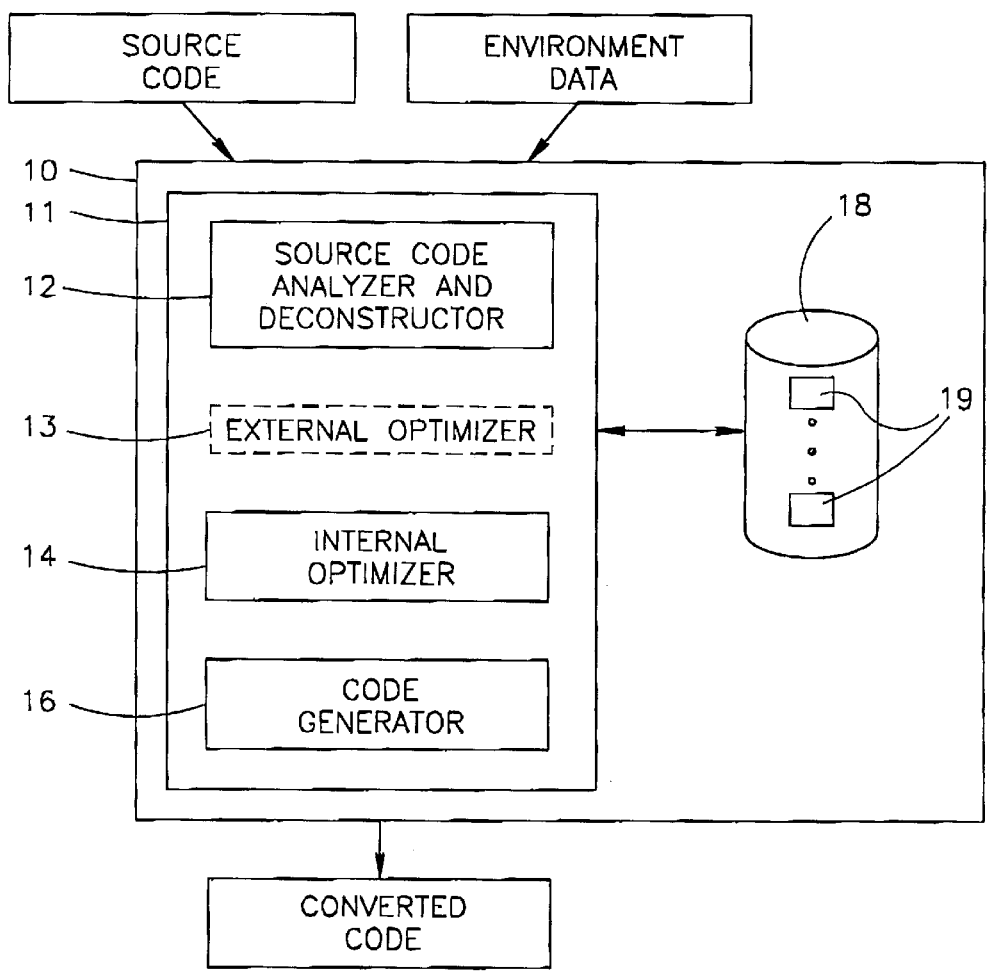
FIG. 1 is a block diagram illustration of an automatic code conversion system, constructed and operative in accordance with a preferred embodiment of the present invention.
Figure 2:
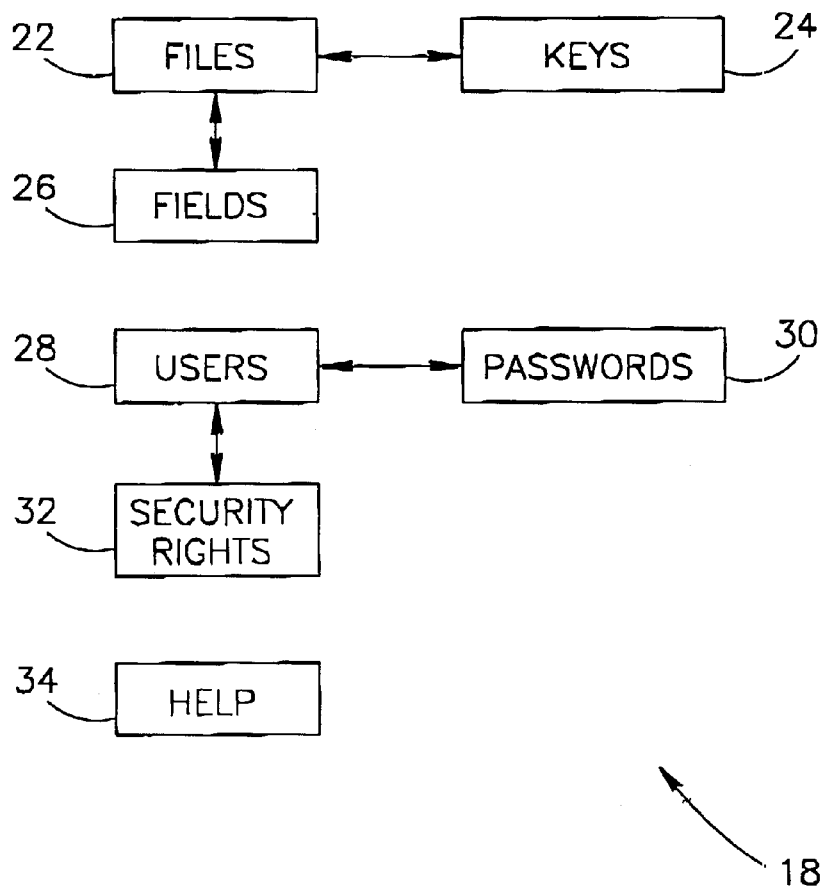
FIG. 2 is a block diagram illustration of an exemplary partial gateway database, constructed and operative in accordance with a preferred embodiment of the present invention.

Reference is now made to FIGS. 1 and 2. FIG. 1 is a schematic block diagram illustration of a code conversion system 10, constructed and operative in accordance with a preferred embodiment of the present invention. Code is conversion system 10 comprises a code module 11 and a gateway database 18. Code module 11 comprises a source-code analyzer and deconstructor 12, an optional external optimizer 13, an internal optimizer 14, and a code generator 16. Gateway database 18 comprises a multiplicity of gateway tables 19.

FIG. 2 is a block diagram of an exemplary partial gateway database 18 constructed and operative in accordance with a preferred embodiment of the present invention. Gateway database 18 comprises the following gateway tables 19: files 22, keys 24, fields 26, users 28, passwords 30, security rights 32, and help 34. Gateway database 18 in FIG. 2 shows a subset of gateway tables 19 that would be found in a full gateway database 18. Some gateway tables 19 are related to each other, for example files table 22 and fields table 26, while others, for example help table 34, stand-alone.

The source code and environment data are inputs to code conversion system 10. The environment data includes information regarding the source and target environments. For example, it is necessary to know the supplier, version, and release of the operating systems, development environments, databases, and software languages of the source and target environments. The environment data may be interactively input by the user or may be input in some other manner, for example from a file. Furthermore, the information may be generated and/or stored automatically.

Source-code analyzer and deconstructor 12 breaks the source code into parts and adds associated records to gateway tables 19 in a manner described hereinbelow with respect to FIGS. 3A, 3B, 4A and 4B. Source-code analyzer and deconstructor 12 decodes the source code by recognition of its keywords. When a keyword is recognized, source-code analyzer and deconstructor 12 finds the parameters associated with the keywords from within the source code. A record is added to the appropriate gateway tables 19 recording the relevant parameters and keywords. For example, if the keyword denotes a field, then an entry is made in a gateway table 19 containing all the fields present in the source code (for example, fields table 26) and an associated parameter is the type of the field. Each gateway table 19 also contains a key field which contain a unique identifier for each record in gateway table 19.

Connections between the fields are maintained by use of these key fields. For example, there is a gateway table 19 containing a list of all files in the application (for example, files table 22), wherein each file record has a unique key. The records in fields table 26 include an entry containing the key from the appropriate record in files table 22. This will be described hereinbelow with respect to FIGS. 3A and 3B.

Optional external optimizer 13 allows a user or outside process to indicate global updates to be made to the application. For example, a user may want to add a new icon to all the GUI screens or to change the name of a certain field throughout the application.

Internal optimizer 14 analyzes and manipulates the data in gateway database 18 and in doing so performs several functions. Some of the changes are initiated by code conversion system 10 and some are initiated by the user by update requests indicated by the user in external optimizer 13, Data in gateway tables 19 is converted from language-specific entries to generic entries. This is necessary when the language-specific entries are different for different environments. This manipulation provides the generic interface between the original environment and code generator 16.

Data in gateway tables 19 are manipulated, for example, to update the connections between records of different gateway tables 19 to match the new program structure being developed. One of the causes for the new structure is the division of the application code into three sections: user interface, business logic and application processes, and database access. This division is in part due to the new technologies being used, for example the use of ADO, OLE DB, ODBC, and the use of new OCXs or new coding libraries.

The data in gateway tables 19 is analyzed, and optimizations are made to the code. For example, stored procedures may be created for database access code, and a file that is used frequently in the application may be opened once on application initialization and closed only on program termination.

If the user indicated global updates to the application via external optimizer 13, the necessary changes to gateway tables 19 are made by internal optimizer 14.

Finally, when gateway table 19 data manipulation is complete, a data integrity check is done.

Code generator 16 takes the data in gateway database 18 and generates the new source code from it. All the necessary information is contained in a generic manner within gateway database 18. As mentioned, the new source code is divided into three sections: the graphical user interface (GUI) the business methods, and the database. The business methods refer to the parts of the code performing functions related to the specific business logic and general application functions.

Figure 3A:
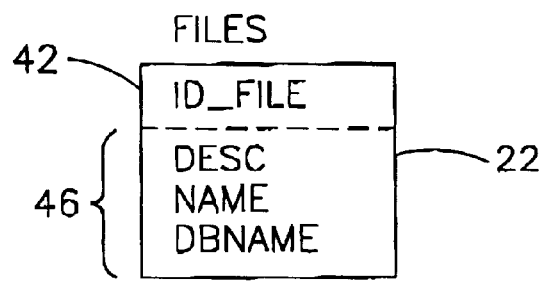
FIGS. 3A and 3B are schematic block diagram illustrations of exemplary gateway tables of the exemplary gateway database of FIG. 2.
Figure 3B:
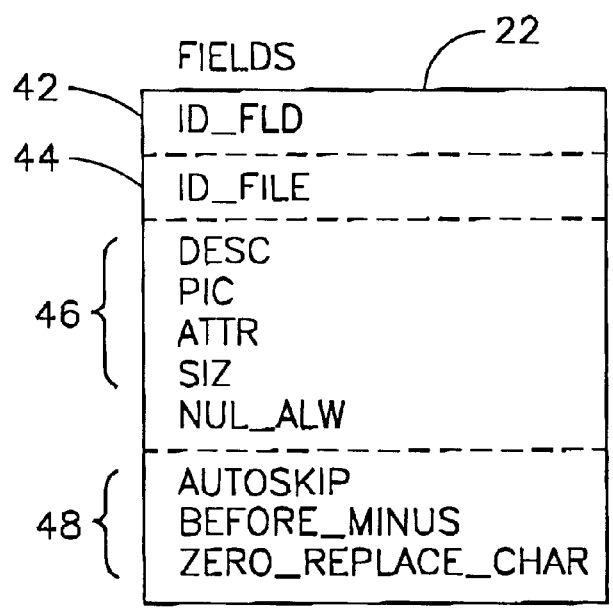

FIGS. 3A and 3B, to which reference is now made, are exemplary schematic illustrations of gateway tables 19 of the exemplary gateway database 18 of FIG. 2. Both FIGS. 3A and 3B comprise several sections, some sections appear in all gateway tables 19 whereas others are table specific.

FIG. 3A depicts a record in files table 22 and is comprised of two sections: section 42, which comprises a single entry containing a unique ID for the record, in this case the unique ID of the file (ID_FILE), and section 46, which comprises entries related to elements found in the original software language. In this case the exemplary entries are DESC (containing a description of the file), NAME (containing the name of the file) and DBNAME (containing the name of the database the file uses).

FIG. 3B depicts a record in fields table 26 and is comprised of four sections: section 42, which comprises the unique ID of the field (ID_FLD); section 44, comprising entries that contain the unique ID of related records in other tables, in this case the unique ID of the file in which this field appears (ID_FILE); section 46, which comprises entries related to elements found in the original software language; and section 48, which comprises entries of generic fields defined to aid in the conversion process. The ID_FILE in section 44 corresponds to the ID_FILE in section 42 of the appropriate record in files table 22. Section 46 in this case comprises the exemplary entries DESC (a description of the field), PIC (a code relating to the display and size of a field), ATTR (the data type of the field), SIZ (containing the size of the field), and NUL_ALW (containing a yes/no code indicating whether nulls are allowed). Section 48 in this case comprises the exemplary entries AUTOSKIP, BEFORE_MINUS, and ZERO_REPLACE_CHAR, generic fields useful with is many software languages that contain codes related to showing nulls and leading and ending zeros.

Figure 4A:
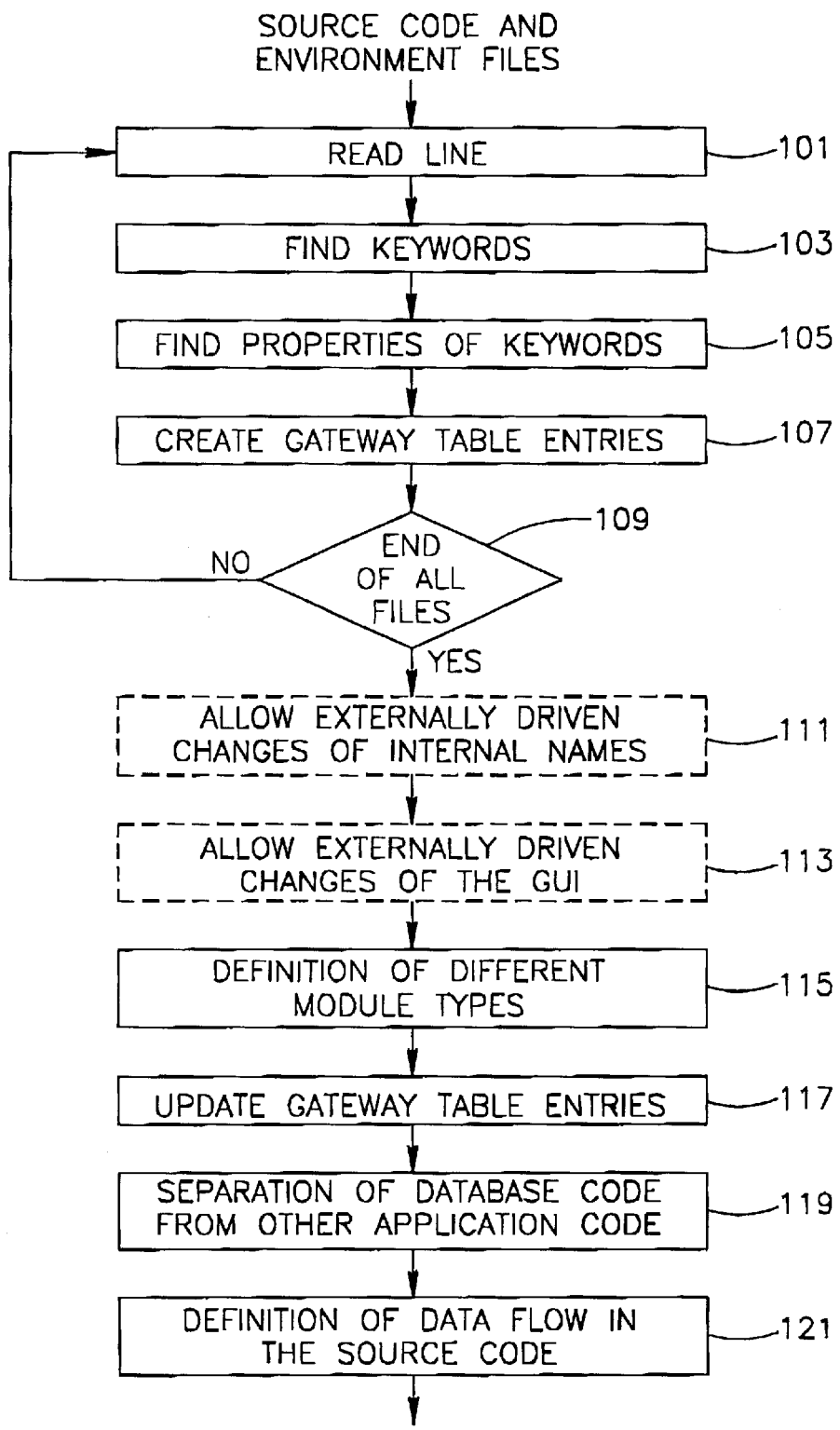
FIGS. 4A and 4B are flowchart illustrations of the steps executed in the automatic code conversion system of FIG. 1.
Figure 4B:
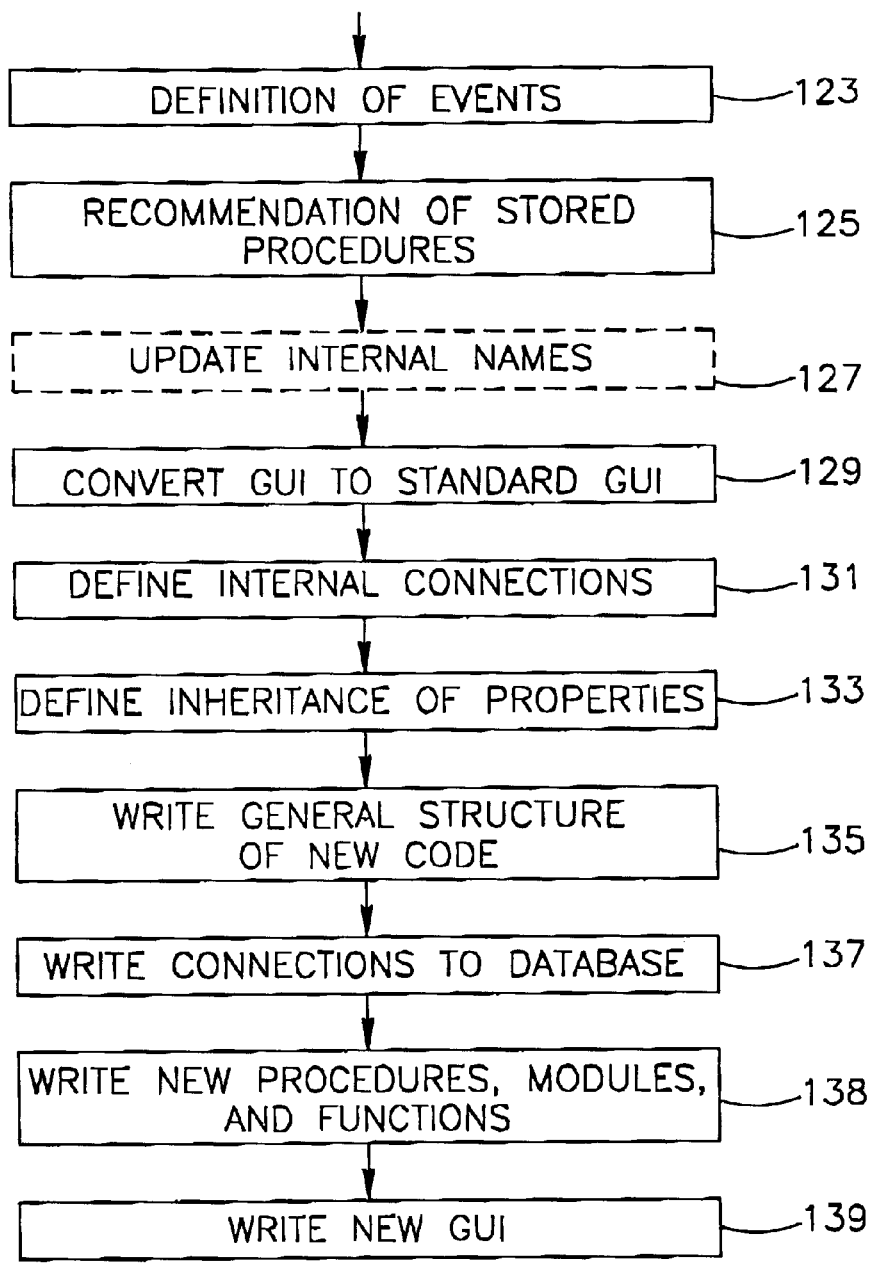

Reference is now made to FIGS. 4A and 4B, flow chart diagrams of the steps executed in automatic code conversion system 10. Steps 101–109 are performed by source-code analyzer and deconstructor 12. Steps 111 and 113 are performed by optional external optimizer 13. Steps 115–133 are performed by internal optimizer 14. Steps 135–139 are performed by code generator 16.

Source code and environment data are read from ASCII text files. In an embodiment of the present invention, the environment data may be entered by the user in a GUI. The GUI contains, for example, a series of forms where a user fills in data regarding the current platform and the new platform. On completion of this entry, the GUI would generate a file of the entered environment data. In an alternate embodiment of the present invention, the environment data may be written directly to a text file using a known format. Other methods of generating the environment data, for example automatically, are also possible and are included in embodiments of this invention.

In steps 101–109 all the source code and environment data files are read line by line, and each line is decoded and analyzed. In step 101 a line is read. In step 103, the line is decoded to find the keywords that appear in the line. These will indicate for example, what type of code line it is e.g. GUI, event, or database access. In step 105 the properties of the keywords and the values of the properties are found. The following exemplary code fragment of Magic code (available from Magic Software Enterprises Inc., New York, USA) and others used hereinbelow are used for illustrative purposes only.

(1) FILE={DESC="Details",DBNAME="Ms-Sql",
(2) FLD={DESC="ID",PIC="999999999",ATTR=N,SIZ= 9,WHLE=9},
(3) FLD={DESC="Name", PIC= "XXXXXXXXXXXXXXX",ATTR=A,SIZ=15}}, This code fragment, which is split over a number of lines, describes a table containing two fields, a name and an ID. The keyword "FILE" indicates that this line refers to a description of the elements of a file or database table. The keyword "FLD" indicates a line referring to a field in a table or file. The variable "DESC" has the name of the FILE or FLD being referred to. In line (1) DESC has the value Details, in line (2) the value ID, and in line (3) the value is Name. The variable DBNAME is the name of the database being used, in this case MS-Sql. DBNAME is a valid parameter for the keyword FILE. Some possible parameters for a FLD follow: "PIC" is a variable particular to the Magic programming language and relates to the display and the size of a field. "ATTR" is a code describing an attribute, i.e. the type of the field, for example, N=numeric, B=boolean, A=alphabetic, and D=date. "SIZ" is the number of units of the field, for example if ATTR=A and on the particular machine a character takes one byte and SIZ=2, then the physical size is two bytes.

Line (1) of the code is read. The word "FILE" is recognized as a line keyword, wherein a line keyword is defined as the first word in a line preceding an "=" sign. Once it is determined whether, for example, a file or table is being described, the appropriate model is used. This model contains a list of the keywords that may legally occur in a FILE description line of code, in the example code DESC and DBNAME appear.

For each new entry into a gateway table, a new unique ID is generated. There is an internal numerator In the program. In an embodiment of the invention, each time a new ID is generated the numerator is incremented.

In step 107, entries are created for the appropriate gateway tables 19. For the exemplary files table 22 of FIG. 3A, a unique ID for this particular file would be entered in section 42 and the values for "DESC" and "DBNAME" would be entered in section 46. The value for "NAME" would have a NULL, since no value appears in the code line.

Further exemplary lines of code follow:
(4) HDR={DESC="Customer Details"},
In step 101 the line is read. In step 103 "HDR" is identified as the keyword. It is recognized by the system that the line refers to a new procedure or subroutine. In step 105 the other keywords present are recognized, in this case "DESC" with the value "Customer Details". In step 107 the values are entered into the appropriate gateway table 19, in this case a table describing all the procedures and subroutines in the application.
(5) DB={FILE=1,MOD=R,OPN=W},
(6) SLCT={NAME="A",FLD=1,},
(7) SLCT={NAME="B",FLD=2,}}, The database table referred to by the keyword "DB" is indicated by "FILE=1". It is the first table in files table 22. The keyword "SLCT" in this case indicates an SQL database select statement.

The following code lines refer to code lines (1)–(7) and will be referred to hereinbelow.
(8) UPD={FLD="A",EXP=1},
(9) ITM={DBOX={X=18, Y=7, DX=171, DY=181}, TYPE=T, FLD=A, PIC="9P0ZA", {CLR=1, FONT=1, STYLE=12611589, ALIGN=18, ISN=1, }}.
(10) EXP=27760479
(11) EXP="Hello"
(12) EXP=date( )

In step 109 there is a check whether the end of the file has been reached. If the end of the file has not been reached, return to step 101 and read the next line. If it has been reached, begin reading the next file, returning to step 101. If all the files have been read, continue with step 111.

Steps 111 and 113 relate to externally driven optimzation. These steps are optional. Step 111 relates to the ability to change the names used internally by the application. This may include file names, procedure and subroutine names, variable names, menu captions and names, form captions and names, field names, keys, indices, report names, and the like. In this step, indication is given that the name should be changed throughout the application. This is actually done in step 127. Step 113 relates to the ability to make global changes to the GUI forms and controls, select new templates and features that will be included when the GUI is rewritten in step 139. Among the features that can be changed are color, font, alignment, appearance, and background.

Steps 115–133 relate to internal optimization of the code, as determined by code conversion system 10. Step 115 separates the application into different types of modules, such as reports, input forms, internal business methods (application-specific functions and subroutines), import/export modules, and database transactions. This separation is important in enabling the new application to be written as a three-tier application, which is appropriate, for example, for an Internet environment. This separation is also important since each module type has different variables and syntax, which requires that there be different procedures for the code separation and for writing the new code. For example, code line 4 containing the keyword "HDR" is recognized as a GUI form module.

In step 117 gateway tables 19 are updated and new gateway tables 19 are created as needed. The update includes such tasks as converting code specific variables to generic variables. For example, code line (9) includes the value "PIC="9P0ZA". This Magic specific variable relates to the size and display of the field "ID" on the screen. 9 gives the number of characters, P0 indicates that leading zeros are displayed, Z indicates that a space is displayed for a null value, A indicates "autoskip", the automatic tabbing to the next field when 9 characters have been entered. These values are now entered into a number of generic fields 48 such as BEFORE_MINUS for P0, ZERO_REPLACE_CHAR for Z, and AUTOSKIP for the A portion.

Step 119 relates to the separation of the databases themselves into distinct modules of the application. For each database used in the application, a connection is created and entered into gateway tables 19. In addition, a table of "selected fields" is created, listing which fields and tables are used by each module. This will also aid in the creation of a three-tier application Step 121 relates to the definition of the data flow within the application. The connections between modules and the linkage to different functions, sub-modules, and procedures must be entered into gateway tables 19. There may be a gateway table 19 containing a description of all the modules that call or activate another module or are themselves called or activated by another is module. The parameters are listed in another gateway table 19. A benefit of this table is the ability to recommend the creation of stored procedures for modules that are called often, since this table gives data on how often a particular module Is called. Another benefit is the ability to compare the parameter list passed to a given function for consistency in number and type with the expected parameter list. This also allows for automatic preventive coding; for example, if the parameter passed is a numeric value and a string is expected, the parameter list for the called function is changed to variant.

Step 123 relates to the definition of events and the objects and commands related to these events. Events are of two types, those initiated by timers and those caused by specific outside events. Events can be system level or application level. These events are entered into tables; exemplary tables are "Application_Events", "Module_Events", and Module_Events_Arguments". Having such tables allows the new code to be written with events and timers correctly integrated.

In step 125 an internal check of the code is done to see which functions are called frequently, as described hereinabove in step 121. A search is done on all modules that have been identified as relating only to data (e.g. are not part of a graphical user interface). Those functions called more than a given number of times, for example 30 times, are marked with a recommendation to create a stored procedure.

If in step 111 or 113 new values were chosen for GUI attributes, they are updated in step 127. For example, if a request was made to update internal names, the new names are entered into the gateway tables 19. Or if, for example, the color of a text box control is changed, then in step 127 the "CLR" field in the "ITM" table is changed [see code line (9)].

In step 129 specific GUI references are converted to recognized standard GUI references. For example, GUI font sizes and resolutions are converted into Microsoft windows standard pixels. Referring back, code line (9) gives values in characters for a GUI text box "DBOX", including "X", "Y", "Dx", "Dy". To convert these values, find the requested screen resolution, then find the number of pixels on the screen, determine the number of pixels per centimeter (cm), convert the values in the "ITM" table to centimeters, multiply the values in cm by the number of pixels per cm, and finally insert the values into new fields in the "ITM" table. For example, if 1 cm=567 pixels, then newX=(18/4*567)= 2551.5. Other exemplary GUI variables that may be converted to standard values are foreground color, background color, and font. Optimiztion of the values in standard units Is possible for such parameters as "ALIGN", "STYLE", "BORDERSTYLE", and "APPEARANCE".

In step 131 internal connections between controls in the GUI are defined. For example, the Z order of the controls on the screen and their tab order are determined. This is done by a review of the "ITM" table and the identification of the controls belonging to a specific screen. Next, the controls of the screen are reviewed and the order of their appearance on the screen from the upper left-hand corner to the lower right hand corner is determined. In addition, a check is made of those controls that are containers, in other words that may include other controls. Examples of such controls are groups, frames. grids, and tabs. The size of each container is determined (from the converted X, Y, Dx, and Dy variables). All the controls are reviewed to find any whose top left corner is within the space of the container. If any are found then they are identified as children of the container and the container is identified as a parent.

In step 133 the inheritance of the properties of objects is added. That is, any properties that an object inherits from other objects are added to the properties list of the first object. These properties are written in a gateway table 19, for example a "TYP" table. In each case where there is inheritance, an entry is made pointing to the correct entry in the "TYP" table. For example, in the Magic line of code:
(13) ITM={DBox={X=20, U=10, DX=200, DY-200}, TYPE=T, FLD=B, {TYP=13, ISN=2,}}, the parameter "TYP=13" indicates that the display characteristics of the control are inherited from the object labeled 13 in the "TYP" table. That entry will contain values for variables such as "CLR", "FNT", "ALIGN", and "STYLE".

In steps 135–139 the new code is generated. The general structure of the new code is set out in step 135. The connections to the databases are written in step 137. In step 138 new procedures, modules, and functions are written. Finally, in step 139 the new GUI is written.

In step 135 files and libraries are gathered into the system library and the code generation process is begun. Among the files that are copied are libraries of DLLs and OCX controls appropriate for the target language.

In step 137, relevant information is collected from the tables to build the modules that connect or are connected to the databases. These modules are written using the appropriate "providers", (Providers, as known in the art, are suppliers of standard utilities.) Standard SOL statements are written using generic SQL, for example "select" statements. Routines are written of the database queries and updates. For example, referring to code lines (5)–(7) in step 107 hereinabove, which were separated Into gateway tables 19, the following new line of code is generated:
(14) select Details.A, Details.B from Details In step 138 routines of events, including timers, are written. This module also deals with general objects that inherit characteristics included in the "TYP" table. For example, code line (8) and code line (10) (step 107) are combined into an update command with A=27760479.

Finally, in step 139, the final code is written. This step includes the inclusion of help files in the application, the creation of menus and their connections to the routines, the writing of the new GUI and its "forms", and the connections to the appropriate routines.

Thus in this invention, the role of the "Gateway Tables" is to allow a dialogue between the source objects and the target format during the process. An additional benefit of using the generic tables is greater flexibility and the need for less coding. This is because the system is not restricted to conversion from specific languages and environments to other specific languages and environments. It is possible to go from any input language and environment to any output language and environment. Thus, if there exist, for example, N drivers to convert input to the generic tables and M drivers to convert from the generic tables, the effective conversion coverage is N*M, where only N+M drivers have been written.

It will be appreciated by persons skilled in the art that the present invention is not limited by what has been particularly shown and described hereinabove. Rather the scope of the invention is defined by the claims that follow:

What is claimed is:

1. A method for automatically converting source code from a first software language and platform to a second software language and a second platform, the method comprising the steps of:
   separating said source code of said first software language and platform into at least one element in at least one table;
   optimizing said at least one element producing at least one optimized element;
   composing said source code in said second software language and said second platform from said at least one optimized element; and
   automatically creating environment files from information about said first and said second platforms.

2. A method according to claim 1 wherein said step of separating comprises the steps of:
   recognizing a line keyword for each of the code lines of said source code;
   finding keywords in each of said respective code lines relating to said line keywords;
   determining the properties of said keywords;
   creating said at least one element from said properties of said keywords; and
   writing said at least one element in at least one table.

3. A method according to claim 1 wherein said step of optimizing comprises the step of analyzing and converting the data encapsulated in said at least one element to produce at least one gateway database entry.

4. A method according to claim 3 wherein said step of analyzing and converting comprises the step of defining different module types.

5. A method according to claim 3 wherein said step of analyzing and converting further comprises the step of updating said at least one element.

6. A method according to claim 5 wherein said step of analyzing and converting further comprises the step of separating database code from other application code.

7. A method according to claim 6 wherein said step of analyzing and converting further comprises the step of recommending the creation of stored procedures from a specified section of said second software language.

8. A method according to claim 5 wherein said step of analyzing and converting further comprises the step of defining the data flow within said source code.

9. A method according to claim 5 wherein said step of analyzing and converting further comprises the step of defining events.

10. A method according to claim 5 wherein said step of analyzing and converting further comprises the step of converting the graphical user interface (GUI) to a recognized standard GUI.

11. A method according to claim 5 wherein said step of analyzing and converting further comprises the step of defining internal connections.

12. A method according to claim 5 wherein said step of analyzing and converting further comprises the step of defining the inheritance of properties.

13. A method according to claim 3 and further comprising the step of externally driven optimization wherein said externally driven optimization step comprises the steps of:
   performing global changes of names and
   performing global changes to a GUI.

14. A method for the automatic generation of a gateway database, the method comprising the steps of:
   separating the source code of a first software language and a first platform into at least one element in at least one table;
   optimizing said at least one element producing at least one optimized element;
   writing said at least one optimized element in said at least one table; and
   automatically creating environment files from information about said platform.

15. A method according to claim 14 wherein said step of separating comprises the steps of:
   recognizing a line keyword for each of the code lines of said source code;
   finding keywords in each of said respective code lines relating to said line keywords;
   determining the properties of said keywords;
   creating at least one element from said properties of said keywords; and
   writing said at least one element in at least one table.

16. A method according to claim 14 wherein said step of optimizing comprises the step of analyzing and converting the data encapsulated in said at least one element to produce at least one gateway database entry.

17. A method according to claim 16 wherein said step of analyzing and converting comprises the step of defining different module types.

18. A method according to claim 16 wherein said step of analyzing and converting further comprises the step of updating said at least one element.

19. A method according to claim 18 wherein said step of analyzing and converting further comprises the step of separating database code from other application code.

20. A method according to claim 19 wherein said step of analyzing and converting further comprises the step of recommending the creation of stored procedures from a specified section of said second software language.

21. A method according to claim 18 wherein said step of analyzing and converting further comprises the step of defining the data flow within said source code.

22. A method according to claim 18 wherein said step of analyzing and converting further comprises the step of defining events.

23. A method according to claim 18 wherein said step of analyzing and converting further comprises the step of converting the GUI to a recognized standard GUI.

24. A method according to claim 18 wherein said step of analyzing and converting further comprises the step of defining internal connections.

25. A method according to claim 18 wherein said step of analyzing and converting further comprises the step of defining the inheritance of properties.

26. A method according to claim 16 and further comprising the step of externally driven optimization wherein said externally driven optimization step comprises the steps of:
   performing global changes of names and
   performing global changes to a GUI.

27. A system for automatically converting source code from a first software language and a first platform to a second software language and a second platform, the system comprising:
   a source-code analyzer and deconstructor for separating said source code of said first software language and said first platform into at least one element in at least one table;
   an optimizer for optimizing said at least one element producing at least one optimized element;
   a code generator for composing said source code in said second software language and said second platform from said at least one optimized element; and
   a unit for automatically creating environment files from information about said first and said second platforms.

28. A system according to claim 27 and further comprising an external optimizer wherein said external optimizer comprises a graphics conversion unit for converting the GUI to a recognized standard GUI.

29. A system according to claim 28 and further comprising an external optimizer wherein said graphics conversion unit comprises:
   a unit for performing global changes of names; and
   a unit for performing global changes to a GUI.

30. A system for the automatic generation of a gateway database, the system comprising:
   a source-code analyzer and deconstructor for separating the source code of a first software language and a first platform into at least one element in at least one table;
   an optimizer for optimizing said at least one element producing at least one optimized element; and
   a unit for automatically creating environment files from information about said platform.

31. A system according to claim 30 and further comprising an external optimizer wherein said external optimizer comprises a graphics conversion unit for converting the GUI to a recognized standard GUI.

32. A system according to claim 31 wherein said graphics conversion unit comprises:
   a unit for performing global changes of names; and
   a unit for performing global changes to a GUI.

* * * * *